United States Patent
Li et al.

(10) Patent No.: US 10,593,934 B2
(45) Date of Patent: Mar. 17, 2020

(54) HYBRID SILICON-METAL ANODE USING MICROPARTICLES FOR LITHIUM-ION BATTERIES

(71) Applicant: APPLEJACK 199 L.P., Los Altos, CA (US)

(72) Inventors: Wenming Li, Los Altos, CA (US); Byunghoon Yoon, Los Altos, CA (US); Ann Koo, Los Altos, CA (US)

(73) Assignee: APPLEJACK 199 L.P., Milpitas, CA (US)

( * ) Notice: Subject to any disclaimer, the term of this patent is extended or adjusted under 35 U.S.C. 154(b) by 103 days.

(21) Appl. No.: 15/464,329

(22) Filed: Mar. 20, 2017

(65) Prior Publication Data

US 2017/0194639 A1 Jul. 6, 2017

Related U.S. Application Data

(62) Division of application No. 13/906,245, filed on May 30, 2013.

(51) Int. Cl.
*H01M 4/1395* (2010.01)
*H01M 4/36* (2006.01)
(Continued)

(52) U.S. Cl.
CPC ........... *H01M 4/364* (2013.01); *B01J 19/126* (2013.01); *B22F 1/0003* (2013.01); *B22F 9/28* (2013.01); *C01B 33/029* (2013.01); *H01M 4/043* (2013.01); *H01M 4/0471* (2013.01); *H01M 4/134* (2013.01); *H01M 4/1395* (2013.01); *H01M 4/386* (2013.01); *H01M 4/387* (2013.01); *H01M 4/623* (2013.01); *H01M 10/052* (2013.01); *H01M 10/058* (2013.01); *H01M 10/0525* (2013.01); *H01M 10/0565* (2013.01); *B01J 2219/0875* (2013.01);
(Continued)

(58) Field of Classification Search
CPC ....... H01M 4/00; H01M 4/364; H01M 4/0471
See application file for complete search history.

(56) References Cited

U.S. PATENT DOCUMENTS

| 2005/0208379 A1* | 9/2005 | Musha | H01M 4/134 |
| | | | 429/231.95 |
| 2007/0172406 A1* | 7/2007 | Pridoehl | C01B 33/02 |
| | | | 423/324 |

(Continued)

FOREIGN PATENT DOCUMENTS

| JP | 2009-164104 A | 7/2009 |
| KR | 10-2008-0009269 A | 1/2008 |
| KR | 10-2009-0112567 A | 10/2009 |

OTHER PUBLICATIONS

KR Decision of Refusal dated Aug. 18, 2017 as received in Application No. 10-2015-7037023.

*Primary Examiner* — James Lee
(74) *Attorney, Agent, or Firm* — Maschoff Brennan (57) ABSTRACT

A system and method of forming a silicon-hybrid anode material. The silicon-hybrid anode material including a microparticle mixture of a quantity of silicon microparticles and a quantity of metal microparticles intermixed with the quantity of silicon microparticles in a selected ratio. The microparticle mixture is formed in a silicon-hybrid anode material layer having a thickness of between about 2 and about 15 μm.

9 Claims, 11 Drawing Sheets

(51) Int. Cl.
  *H01M 4/04*      (2006.01)
  *H01M 4/38*      (2006.01)
  *H01M 10/052*    (2010.01)
  *H01M 4/134*     (2010.01)
  *H01M 10/0525*   (2010.01)
  *H01M 10/0565*   (2010.01)
  *H01M 10/058*    (2010.01)
  *B01J 19/12*     (2006.01)
  *B22F 1/00*      (2006.01)
  *B22F 9/28*      (2006.01)
  *C01B 33/029*    (2006.01)
  *H01M 4/62*      (2006.01)
  *H01M 2/16*      (2006.01)
  *H01M 4/02*      (2006.01)

(52) U.S. Cl.
  CPC ... *B01J 2219/1206* (2013.01); *B22F 2301/30* (2013.01); *B22F 2302/45* (2013.01); *B22F 2304/10* (2013.01); *B22F 2998/10* (2013.01); *H01M 2/1653* (2013.01); *H01M 2004/021* (2013.01); *H01M 2004/027* (2013.01); *H01M 2200/103* (2013.01); *H01M 2220/20* (2013.01); *H01M 2300/0025* (2013.01); *H01M 2300/0068* (2013.01); *H01M 2300/0082* (2013.01); *Y02T 10/7011* (2013.01)

(56) References Cited

U.S. PATENT DOCUMENTS

| | | | | |
|---|---|---|---|---|
| 2009/0104535 | A1* | 4/2009 | Kim | H01M 4/131 429/231.8 |
| 2013/0230777 | A1* | 9/2013 | Babic | H01M 4/134 429/231.6 |
| 2015/0287980 | A1* | 10/2015 | Chen | B22F 3/1134 429/406 |

* cited by examiner

HYBRID SILICON-METAL ANODE USING MICROPARTICLES FOR LITHIUM-ION BATTERIES

CROSS-REFERENCE TO RELATED APPLICATIONS

This application is a divisional of U.S. patent application Ser. No. 13/906,245, filed May 30, 2015, titled HYBRID SILICON-METAL ANODE USING MICROPARTICLES FOR LITHIUM-ION BATTERIES, which is incorporated herein by reference in its entirety.

BACKGROUND

The present invention relates generally to electrical power storage systems, and more particularly, to methods and systems for making lithium-ion batteries.

Traditional lithium ion batteries lack sufficient energy density (Watt-hours/kilogram) for many electrical systems. By way of example, the insufficient energy density of traditional lithium-ion batteries limits the electric vehicle driving range between recharges. Electric vehicles are a major step in moving transportation systems of a modern, energy based economy away from greenhouse gas emitting fossil fuel engines.

In view of the foregoing, there is a need for an electrical energy storage solution with a greater energy density than traditional lithium-ion batteries.

Broadly speaking, the present invention fills these needs by providing a lithium-ion battery using microparticles as an electrical energy storage solution electrical power storage system. It should be appreciated that the present invention can be implemented in numerous ways, including as a process, an apparatus, a system, computer readable media, or a device. Several inventive embodiments of the present invention are described below.

One embodiment provides a system and method of forming a silicon-hybrid anode material. The silicon-hybrid anode material including a microparticle mixture of a quantity of silicon microparticles and a quantity of metal microparticles intermixed with the quantity of silicon microparticles in a selected ratio. The microparticle mixture is formed in a silicon-hybrid anode material layer having a thickness of between about 2 and about 15 µm.

The microparticle mixture can include a quantity of at least one binder material. The microparticle mixture can be heated and the quantity of at least one binder material is substantially evaporated away. The microparticle mixture can be annealed.

The quantity of silicon microparticles can have a size range of between about 1 micrometer and about 20 micrometers. The quantity of metal microparticles has a size range of between about 1 micrometer and about 30 micrometers. The size of the silicon microparticles can be substantially equal to the size of the metal microparticles.

The selected ratio of the microparticle mixture includes between about 10 percent and about 40 percent, by weight, of silicon microparticles and between about 90 percent and about 60 percent, by weight, of metal microparticles. The binder is between about 5 percent and about 10 percent by weight of the microparticle mixture.

At least one silicon-hybrid anode material layer can be included in a battery. The battery can be a lithium-ion battery. The lithium-ion battery can also include a lithium containing electrolyte, a quantity of separator material is included within the lithium containing electrolyte and a cathode disposed on a side of the electrolyte opposite from the at least one silicon-hybrid anode material layer.

Another embodiment provides a method of forming a silicon-hybrid anode material. The method includes forming a quantity of silicon microparticles, forming a quantity of metal microparticles, mixing the quantity of silicon microparticles and the quantity of metal microparticles in a selected ratio to form a microparticle mixture and forming the microparticle mixture into a silicon-hybrid anode material layer having a thickness of between about 2 and about 15 µm.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE PREFERRED EMBODIMENTS

Several exemplary embodiments for a lithium-ion battery using microparticles as an electrical energy storage solution, electrical power storage system and methods will now be described. It will be apparent to those skilled in the art that the present invention may be practiced without some or all of the specific details set forth herein.

Typically available lithium-ion battery packs, such as may be used in an electric vehicle (EV), are prohibitively expensive for powering a mass transportation system.

Conventional lithium-ion batteries use carbon-based graphite anodes. Silicon (Si) is a promising anode materials in solid state lithium-ion battery applications due to the high charge density and low operation voltage with maximum lithium uptake of Li/Si=4.4/1.0, Li22Si5. By way of example, a higher charge density for silicon is 3,579 milliamp-hours per gram (mAh g−1) at ambient temperature as compared to the maximum theoretical charge density of 372 mAh g−1 for a conventional graphite anode system.

Unfortunately the volume of a bulk silicon anode drastically expands during the lithium-ion intercalation (i.e., lithiation). At the reduced volume of materials, surface-to-volume ratio increased and "bulk properties" of the materials can be affected substantially.

In contrast, silicon nanoparticles demonstrate different chemical and physical properties from the bulk silicon properties allowed by the significant smaller physical size (e.g., between about $10^{-9}$ and about $10^{-6}$ meter) for each nanoparticle as compared to the bulk silicon. Unfortunately, silicon nanoparticles as an anode electrode in a lithium-ion battery system demonstrated approximately 400% volume expansion/contraction of the silicon during the charge/lithiation and discharge/delithiation phases. This drastic silicon volume change during the charge/lithiation and discharge/delithiation cycles causes a major degradation of the silicon anode lithium-ion battery and leads to an eventual electrode failure.

A new hybrid silicon-based anode material for a lithium-ion battery is disclosed below. The disclosed hybrid silicon-based anode materials can be binary or ternary or more element hybrid silicon-soft metal microparticles. Suitable soft metals include metals that are polarizable. Neutral nonpolar species have spherically symmetric arrangements of electrons in their electron clouds. When in the presence of an electric field, neutral nonpolar species electron clouds can be distorted. The ease of this distortion is defined as the polarizability of the atom or molecule. Polarizable means species has an easily distorted cloud of electrons. In general, polarizability of an atom correlates with the interaction between electrons and the nucleus. The amount of electrons in a molecule affects how closely or tightly the nuclear charge can control the overall charge distribution. Atoms with fewer electrons have smaller, denser electron clouds, as there is a strong interaction between the few electron's orbitals and the positively charged nucleus. There is also less shielding in atoms with less electrons contributing to the stronger interaction. of the outer electrons and the nucleus.

By way of example, in a two atom molecule, the electrons may be attracted to the nuclei of both atoms. However, if a first nucleus attracts more strongly than the other (usually because the first atom has fewer electrons held in a denser cloud), then the bonding electrons from both nuclei tend to be located closer to the first nucleus than the other nucleus. As a result, the bonding electrons are unevenly distributed and form a polar bond between the two atoms. In contrast, when electrons experience an equal attractive force to both. nuclei, the bond is non-polar, Polarizability also affects dispersion forces through the molecular shape of the affected molecules, Elongated molecules have electrons that are easily moved increasing their polarizability and thus strengthening the dispersion forces. In contrast, small, compact, symmetrical molecules are less polarizable resulting in weaker dispersion forces, Dispersion forces are a type of force acting between atoms and molecules. Therefore, polarization is caused by both intramolecular force (all type of chemical bond) and intermolecular force (induced instantaneous polarization. multi-poles in molecules), Some example suitable soft metals include tin (Sn), copper (Cu), platinum (Pt), gold (Au), thallium (Tl), lead (Pb), mercury (Hg), cadmium (Cd), silver (Ag), aluminum (Al) and germanium (Ge) and combinations thereof and other suitable soft metals can be useful for fabrication of hybrid silicon anode materials. The soft metal used is ideally at least 99.9% pure, however it should be understood that a greater purity (e.g., about 99.99% or more) soft metal and somewhat less purity (e.g., about 99% purity or less) soft metal can be used.

The hybrid silicon-based anode materials can use binary microparticles such as silicon and one soft metal, by way of example Si—Sn. The hybrid silicon-based anode materials can use ternary microparticles such as silicon and two soft metals, by way of example Si—Sn—C, or other combinations of silicon and soft metal microparticles. More complex examples having four or more materials include Si—Sn—Ag (silver)-C or Si—Sn—Ag—Al (aluminum)-C. The hybrid silicon-based anode materials reduce silicon volume changes significantly without losing capacity during the lithiation/charge and delithiation/discharge phases.

As will be described in more detail below, the hybrid silicon-based anode material is also annealed. The annealed, hybrid structure of hybrid silicon-based anode material particles relieves the stress occurring during the expansion and contraction of the silicon during the respective lithiation/charge and delithiation/discharge phases. The annealing processing of the hybrid silicon-based anode material particle geometries substantially prevents cracking, buckling and eventual aggregation of the silicon-based anodes, thus improving the capacity and cycle life. The hybrid silicon-based anode material can have a charge density of greater than about 3,500 mAh g−1.

Figure 1:
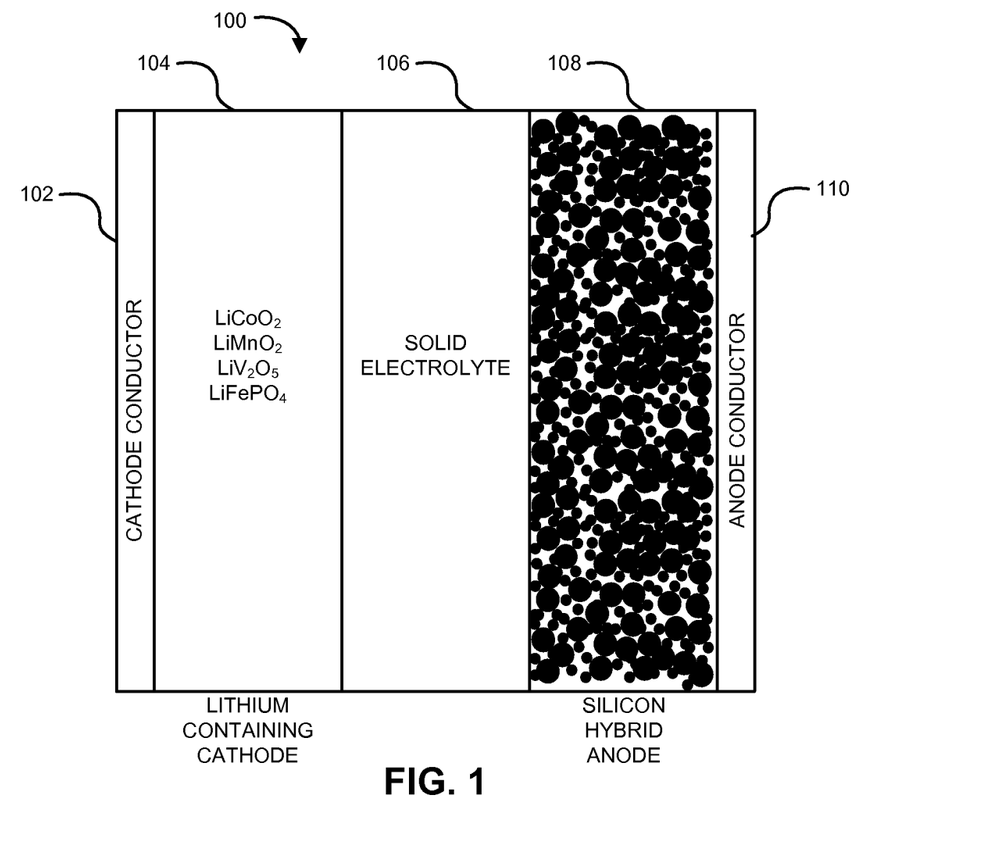
FIG. 1 is a simplified schematic of a lithium-ion battery including a hybrid, silicon-based microparticle anode material, in accordance with embodiments of the present invention.

The hybrid silicon-based anode materials are compatible with other typical lithium-ion battery materials and thus require no other lithium-ion battery structural or material changes. Therefore, known cathode materials such as lithium cobalt oxide (LiCoO2), lithium manganese oxide (LiMn2O4), lithium vanadium oxide (LiV2O5), lithium iron phosphate (LiFePO4), lithium nickel manganese cobalt oxide (LixNiyCozMgmO2), and lithium nickel cobalt aluminum oxide(LixNiyCozAlmO2) and solid electrolytes used in conventional lithium-ion battery structures can be used with the hybrid silicon-based anode materials as shown in FIG. 1. The lithium-ion battery structure described herein include carbonate-based electrolytes and/or polymer electrolyte and/or solid inorganic electrolytes having a lithium-ion conductivity of greater than about 5×10−3 S/cm and are matched with the hybrid silicon-based anode material.

Optionally, a separator material of either polyethylene or polypropylene can be included in the battery. The separator materials are located anywhere between the anode and cathode such as being mixed within the electrolyte. The separator material acts as a thermal "fuse" and melts when the lithium-ion battery overheats to greater than about 120 to about 170 degrees C. as may be chosen for the desired application. The melted separator material stops the lithium-ion flow between anode and cathode, thus preventing an uncontrolled exothermic event such as may occur in an accidental short circuit of the battery anode to the cathode or other excessive power draw from or excessive power input to the hybrid silicon-based anode, lithium-ion battery.

FIG. 1 is a simplified schematic of a lithium-ion battery 100 including a hybrid, silicon-based microparticle anode material, in accordance with embodiments of the present invention. The lithium-ion battery 100 includes a cathode current conductor 102 and an anode current conductor 110. The cathode current conductor 102 and the anode current conductor 110 are typically formed of copper, copper alloy or other highly conductive metal. A lithium containing cathode 104 is in electrical contact with the cathode current conductor 102. A hybrid silicon-based microparticle anode material 108 is in electrical contact with the anode current conductor 110. The hybrid silicon-based microparticle anode material is described in more detail below. A solid electrolyte 106 is disposed between the lithium containing cathode 104 and the silicon hybrid anode 108.

Microwave chemistry relies on the ability of the reaction mixture to absorb microwave energy coupled into the gas flow forming plasma such as dipolar polarization or ionic conduction mechanisms. This produces rapid thermal internal heating by direct interaction between electromagnetic irradiation and reagent molecules. Applying a sufficiently high microwave field density can cause decomposition of source gas flows. The decomposition products can then be used to form hybrid silicone-metal materials and/or hybrid silicon-carbonaceous materials.

A high speed microwave synthetic method was used to produce silicon microparticles. The microwave induced electrical discharge dissociation of silane ($SiH_4$) or disilane ($Si_2H_6$) with a mixture of hydrogen ($H_2$) and argon (Ar) gas produces Si microparticles in a low pressure flow reactor.

Figure 2:
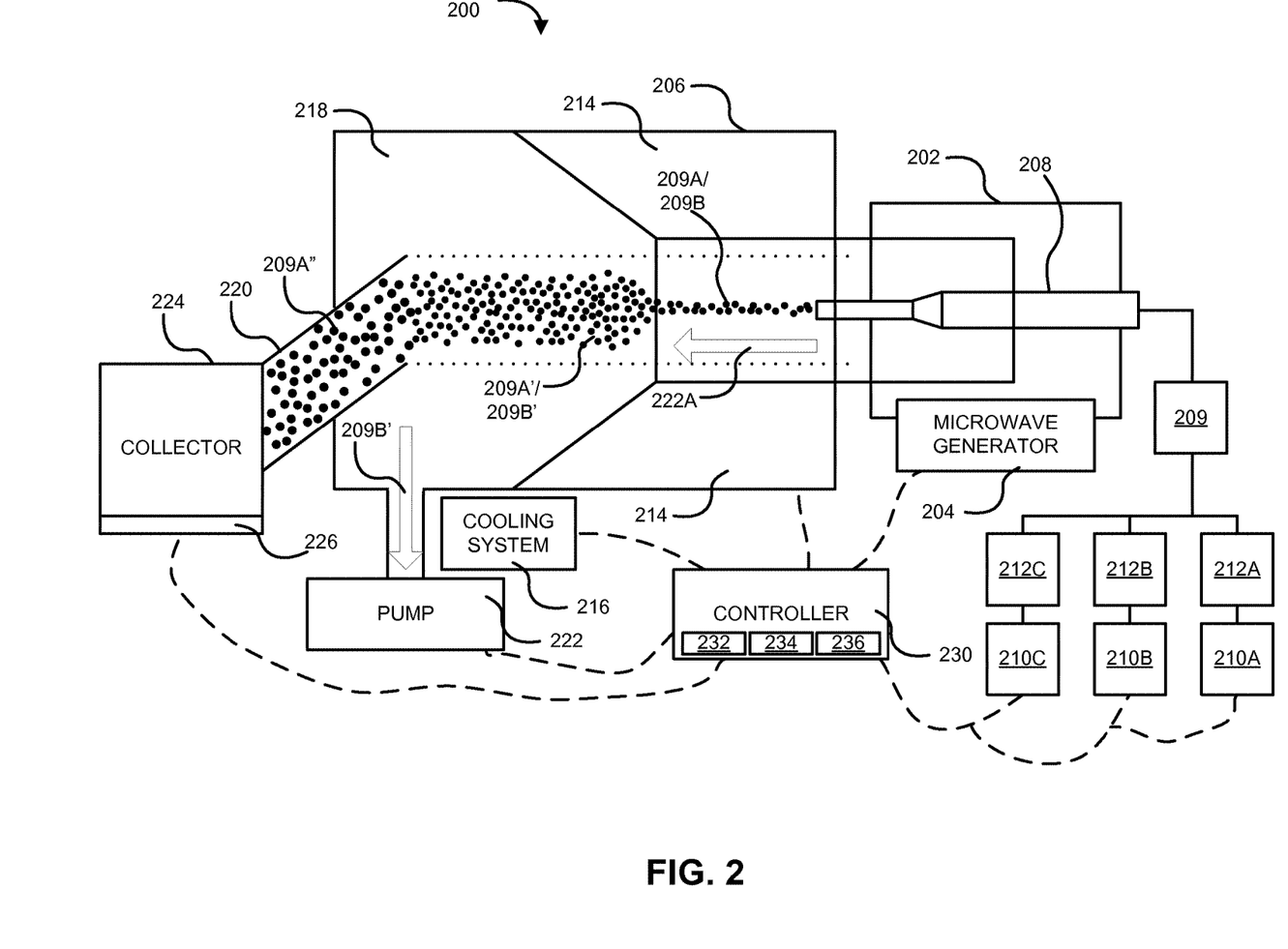
FIG. 2 is a simplified schematic of a microwave induced decomposition reactor chamber system, in accordance with embodiments of the present invention.

FIG. 2 is a simplified schematic of a microwave induced decomposition reactor chamber system 200, in accordance with embodiments of the present invention. The microwave induced decomposition reactor chamber system 200 includes a microwave induced decomposition reactor chamber 202 and a microwave generator 204 for generating a microwave field within the microwave induced decomposition reactor chamber 202. The microwave induced decomposition reactor chamber system 200 also includes multiple process gas sources 210A, 210B, 210C coupled through respective flow control devices 212A, 212B, 212C to a nozzle 208 disposed inside the microwave induced decomposition reactor chamber 202.

The microwave induced decomposition reactor chamber system 200 also includes a cooling chamber 206. The cooling chamber 206 includes cooled walls 214 as will be described in more detail below. A cooling system 216 is coupled to the cooled walls 214 to maintain the cooled walls at a desired temperature. The cooling chamber 206 also includes an outlet chamber 218 located downstream of the cooled walls 214. A pump 222 draws the flow of the process gases in a direction 222A from the nozzle 208 and into the outlet chamber 218. An outlet port 220 couples the outlet chamber 218 to a collector 224. The collector 224 can optionally include a temperature control system 226 to maintain the collector at a desired collector temperature.

The microwave induced decomposition reactor chamber system 200 also includes a controller 230 for controlling the processes in each portion of the microwave induced decomposition reactor chamber system. The controller 230 is coupled to the process gas sources 210A, 210B, 210C, the microwave induced decomposition reactor chamber 202, the cooling chamber 206 and the temperature control system 226. The controller 230 includes software 232, logic 234 and processing capability to control, monitor and operate the various components in the microwave induced decomposition reactor chamber system 200.

Figure 3:
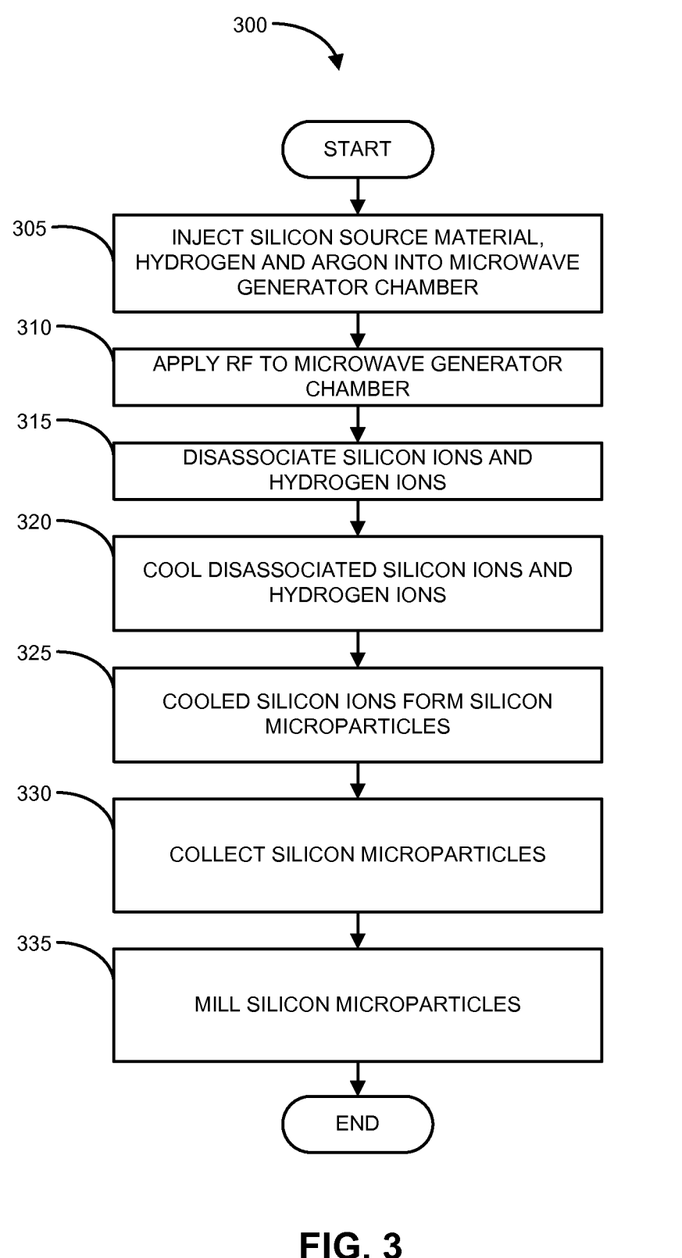
FIG. 3 is a flowchart diagram that illustrates the method operations performed in forming the silicon microparticles, in accordance with embodiments of the present invention.

FIG. 3 is a flowchart diagram that illustrates the method operations 300 performed in forming the silicon microparticles, in accordance with embodiments of the present invention. The operations illustrated herein are by way of example, as it should be understood that some operations may have sub-operations and in other instances, certain operations described herein may not be included in the illustrated operations. With this in mind, the method and operations 300 will now be described.

In an operation 305, a process gas mixture of a silicon source material (e.g., silane ($SiH_4$) or other suitable silicon source material), hydrogen ($H_2$) and argon (Ar) is injected into the microwave generator chamber 202 through a nozzle 208. The silicon source material (Silane, Disilane), hydrogen and argon gases can be mixed in a mixer 209 before injection into the nozzle 208. The ratio of the reduction or burning gas ($H_2$), depending on the morphology of the synthesized silicon particles, and the carrier gas (Ar) can be varied, between about 1 part ($H_2$) to 50 parts (Ar) (1:50 ratio) and 2 part ($H_2$) to 50 parts (Ar) (2:50 ratio). Flowrate of the gas mixture is between about 10-20 slpm (standard liters per minute) in to the microwave generator chamber. The silane ($SiH_4$) of at least 99% purity and hydrogen ($H_2$) and argon (Ar) are each about 99.99% pure (e.g. "four nines purity"). It should be understood that even greater purity gases could also be used. The respective flow rates of the silane ($SiH_4$), hydrogen ($H_2$) and argon (Ar) are monitored by calibrated flow meters and controlled to determine the silicon microparticle size distribution.

In an operation 310, about 900 W radio frequency power, at about 2.45 GHz frequency, is applied to the microwave generator chamber to form a plasma in the microwave generator chamber due to the excitation caused by the applied RF power. The microwave generator chamber can be operated at a reaction temperature of between about 300 degrees C. and about 700 degrees C. and at a pressure of between about 100 mTorr and about 100 TOIT.

In an operation 315, the plasma produced by Ar in the radio-frequency electric current dissociates the silane ($SiH_4$) with hydrogen ($H_2$) to produce silicon ions 209A. The disassociated silicon ions 209A are drawn out of the microwave generator chamber in direction 222A and past one or more a cold walls 214 to cool the disassociated silicon ions 209A, in an operation 320.

The reduced silicon species can be cooled and aggregated to form silicon microparticles 209A' in an operation 325. The extra hydrogen 209B cool and are drawn into the pump 222. The cold walls 214, 220 have a temperature range of between about 25 degrees C. and about minus 196 degrees C., so as to sufficiently cool the disassociated silicon ions 209A and hydrogen 209B. The cold walls 214 can be cooled by any suitable coolant such as liquid nitrogen, water, ethylene glycol, dry ice (i.e., solid form carbon dioxide) in acetone, or any other suitable cooling system or media. The formed silicon microparticles 209A' pass through cold walls 220 and the particle size range in the collector 224 is between about 1 to about 20 um after passing near the cold walls 220. The formed silicon microparticle 209A' size distribution can be selected by power of the microwave generator, flow rate of the process gas reactants and ratio of the reactants. As power of the microwave is increased, the formed plasma is able to reduce the reaction energy at low reaction temperatures (e.g., about ambient temperatures of between about 20 and about 35 degrees C.). The size distribution of the formed particles can be affected by the reactant concentration and flow rate. In general, the agglomeration during the transport is a result of the high concentration (mass, molar, number and volume concentration) of the reactants. Another important factor for the particle size distribution is the cooling temperature of the cold wall.

The concentration of silane in the above mentioned gas mixture using hydrogen and argon (1-2% of hydrogen) is varied in the range of 1,000 ppm to 10,000 ppm. The microwave generator 204 can operate up to about 2,000 W output power at 2.45 GHz frequency and can be operated at a reaction temperature from 25 to 700° C. and under from 100 m Ton to 100 Ton. The morphology of the generated silicon particles depends on reaction temperature. For example, small crystals surrounded by amorphous particles can be synthesized under 300° C., however crystalline structure of particles can be collected above 600° C.

In an operation 330, the formed silicon microparticles 209A" are collected in a collector 224. The collector 224 can include multiple layers of nets. The nets are formed of a suitable sieve material such as steel, stainless steel, copper, nickel and alloys thereof and any other suitable material. The nets have openings of between about 15 to about 20 micrometer width. In an optional operation 335, the collected silicon microparticles 209A" are milled to a desired microparticle size and the method operations can end. After synthesis of the silicon microparticles 209A" can be milled process using a milling machine such as conventional vibrating ball milling machine to achieve narrow particle size distribution (1-5 micrometer).

Figure 4:
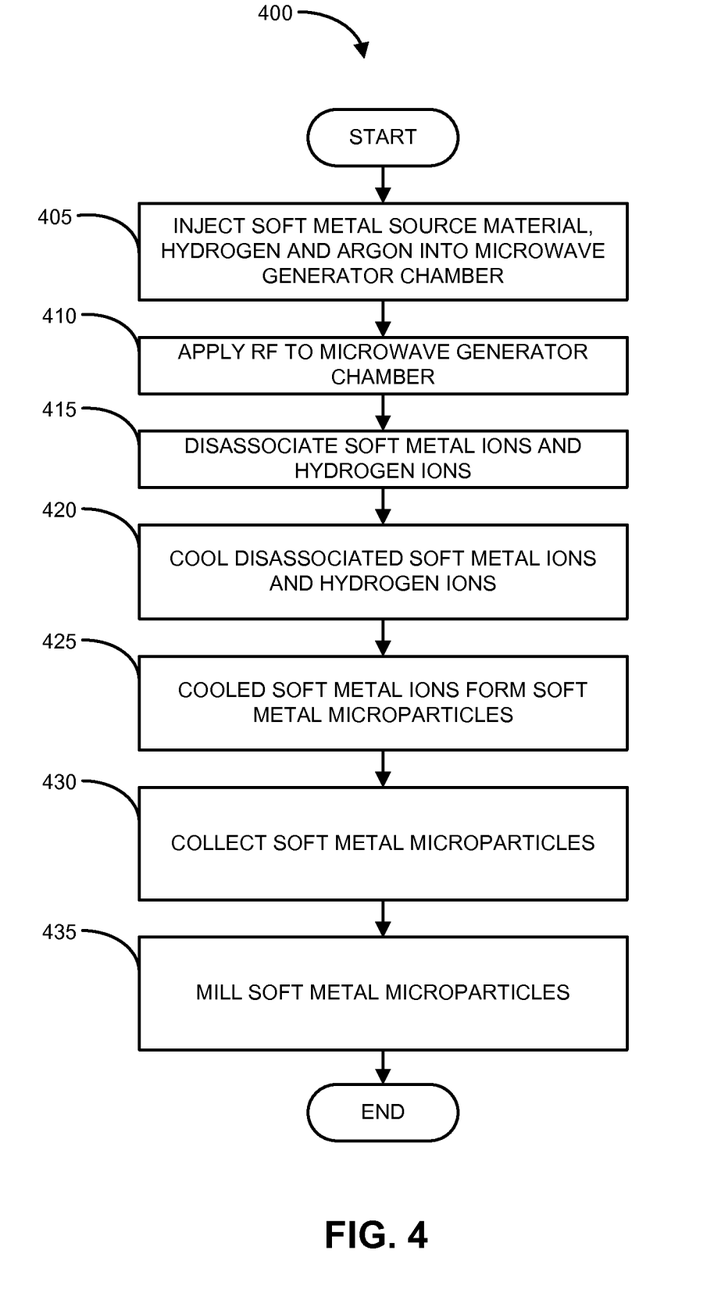
FIG. 4 is a flowchart diagram that illustrates the method operations performed in forming soft metal microparticles, in accordance with embodiments of the present invention.

The soft metal microparticles can be formed substantially similarly to the silicon microparticles as described in FIG. 3 above. FIG. 4 is a flowchart diagram that illustrates the method operations 400 performed in forming soft metal microparticles, in accordance with embodiments of the present invention. The operations illustrated herein are by way of example, as it should be understood that some operations may have sub-operations and in other instances, certain operations described herein may not be included in the illustrated operations. With this in mind, the method and operations 400 will now be described. By way of example, tin (Sn) microparticles can also synthesized using a gas mixture of soft metal source material such as tetramethyltin ($Sn(CH_3)_4$, TMT) as a tin source material, hydrogen ($H_2$) and argon (Ar).

In an operation 405, a gas mixture of TMT, hydrogen ($H_2$) and argon (Ar) is injected into the microwave generator chamber. Flowrate of the gas mixture is between about 10 and about 20 standard liters per minute (slpm) into the microwave generator chamber. The concentration of the TMT is between about 2000 and about 8000 ppm in the mixture. The TMT is about 99% pure and the hydrogen ($H_2$) and argon (Ar) are each about 99.99% pure (e.g. "four nines purity"). It should be understood that even greater purity gases could also be used. The respective flow rates of the tetramethyltin ($Sn(CH_3)_4$, TMT), $H_2$ and Ar are monitored by calibrated flow meters and controlled to determine the tin microparticle size distribution and synthesis. The decomposition of tin source material in the reactor, the reaction temperature and the residence time of the tin species in the reactor are important parameters of the tin particle synthesis and size distribution. Alternatives to tin source materials than TMT include, but are not limited to Tetramethyltin, Tetravinyltin ($Sn(CH=CH_2)_4$), Trimethyl(phenyl)tin ($C_6H_5Sn(CH_3)_3$), Tricyclohexyltin hydride (($C_6H_{11}$)SnH) and Hexaphenylditin (($C_6H_5$)$_3$Sn)$_2$).

In an operation 410, about 900 W radio frequency power, at about 2.45 GHz frequency, is applied to the microwave generator chamber to form a plasma in the microwave generator chamber due to the excitation caused by the applied RF power. The microwave generator chamber can be operated at a reaction temperature of between about 25 and about 700 degrees C. and at a pressure of between about 100 mTorr and about 100 Ton. Amorphous tin microparticles particles can be formed at an ambient temperature of about 25 degrees C., however, polycrystalline tin microparticles can be formed above 300 degrees C. A combination of amorphous tin microparticles and polycrystalline tin microparticles can be used in various ratio combinations to form the hybrid silicon anode materials.

In an operation 415, the plasma dissociates the TMT to produce tin and hydrogen. The disassociated tin and hydrogen are drawn out of the microwave generator chamber and past one or more cold walls to cool the disassociated tin and hydrogen, in an operation 420. The formed tin species 209A can form tin microparticles as the tin passes through the cold wall 220. The formed particle size distribution can be controlled by the cooling temperature from about 25 degrees C. to about −196 degrees C. The cold wall 220 has the lowest temperature in the particle synthetic process In an operation 425, the formed tin microparticles are collected in a temperature controlled collector 224. The collector 224 can include multiple layers of nets. The nets are formed of a suitable sieve material such as steel, stainless steel, copper, nickel and alloys thereof and any other suitable material. The nets have openings of between about 15 to about 20 micrometer width. The particle collector 224 is maintained at approximately ambient temperature of between about 15 degrees C. and about 30 degrees C. In an optional operation 430, the collected tin microparticles are milled to a desired microparticle size and the method operations can end.

Figure 5:
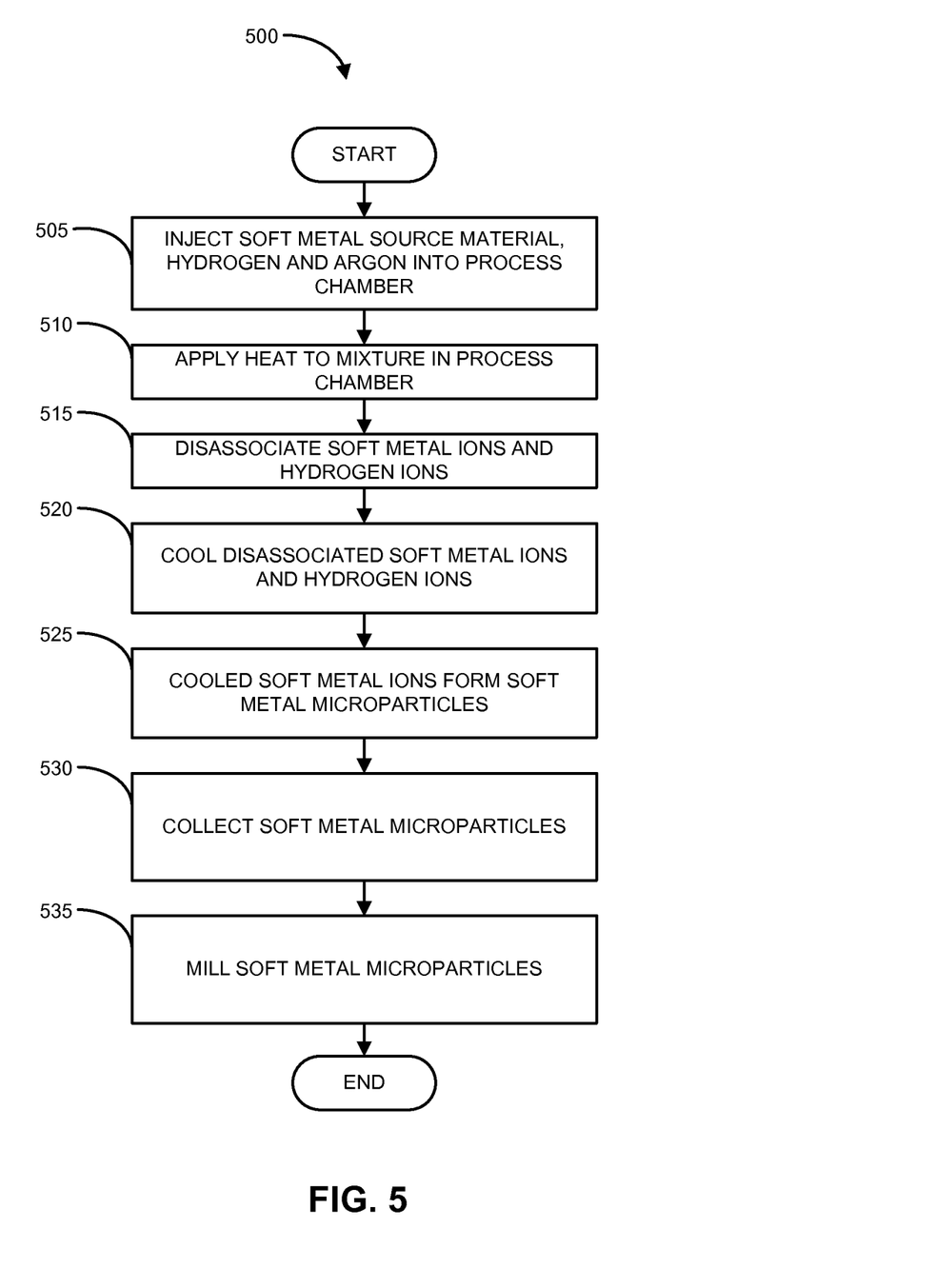
FIG. 5 is a flowchart diagram that illustrates an alternative method operations performed in forming soft metal microparticles by thermal evaporation, in accordance with embodiments of the present invention.

FIG. 5 is a flowchart diagram that illustrates an alternative method operations 500 performed in forming soft metal microparticles by thermal evaporation, in accordance with embodiments of the present invention. The operations illustrated herein are by way of example, as it should be understood that some operations may have sub-operations and in other instances, certain operations described herein may not be included in the illustrated operations. With this in mind, the method and operations 500 will now be described. By way of example, tin (Sn) microparticles can also synthesized using a gas mixture of tetramethyltin ($Sn(CH_3)_4$, TMT), hydrogen ($H_2$) and argon (Ar) in a thermal evaporation process.

In an operation 505, a gas mixture of TMT, hydrogen ($H_2$) and argon (Ar) is injected into a processing chamber. Flowrate of the gas mixture is between about 10-20 slpm (standard liters per minute) into the processing chamber.

In an operation 510 the gas mixture is heated by a heat source to between about 25 to about 300 degrees C. The heat source can be any suitable heat source such as resistive heater, an electron beam heater (such as may be found in a typical sputtering reactor). For resistive heat source, the heater elements draw electrical current as high as 50-100 A or more and voltage as low as 6-20V.

In an operation 515, the heated gas mixture dissociates the TMT to produce tin and hydrogen. The disassociated tin and hydrogen are drawn out of the processing chamber and past one or more cold walls to cool the disassociated tin and hydrogen ions, in an operation 520. The tin microparticles form in a size range of between about 1 and about 30 um.

In an operation 525, the formed tin microparticles are collected in a temperature controlled collector. In an optional operation 530, the collected tin microparticles are milled to a desired microparticle size and the method operations can end.

Composite materials are prepared by thermal or mechanical process. For example, pyrolysis, mechanical mixing and milling, or some combinations of thermal and mechanical methods are useful preparation techniques. The hybrid binary silicon-based anode materials can include of silicon and tin microparticles on solid substrates. The hybrid ternary silicon-based anode materials can include silicon and tin microparticles with carbonaceous microparticles as a third ingredient.

Figure 6:
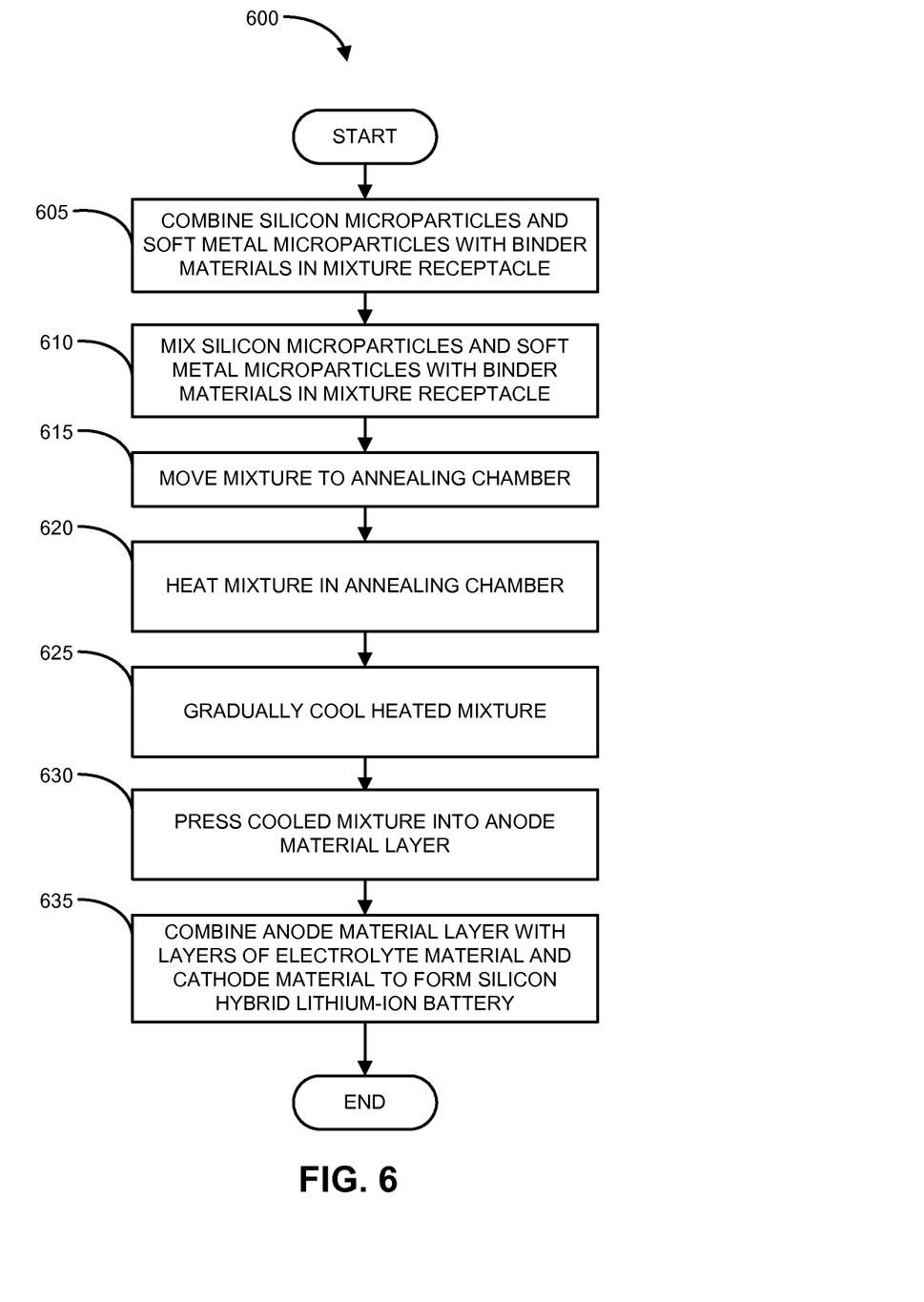
FIG. 6 is a flowchart diagram that illustrates the method operations performed in forming a lithium-ion battery including the hybrid silicon-based anode material, in accordance with embodiments of the present invention.

FIG. 6 is a flowchart diagram that illustrates the method operations 600 performed in forming a lithium-ion battery including the hybrid silicon-based anode material, in accordance with embodiments of the present invention. The operations illustrated herein are by way of example, as it should be understood that some operations may have sub-operations and in other instances, certain operations described herein may not be included in the illustrated operations. With this in mind, the method and operations 600 will now be described. The hybrid binary silicon-based anode materials for a lithium-ion battery are composed of silicon and tin microparticles formed as described above in FIGS. 3-5.

Figure 7:
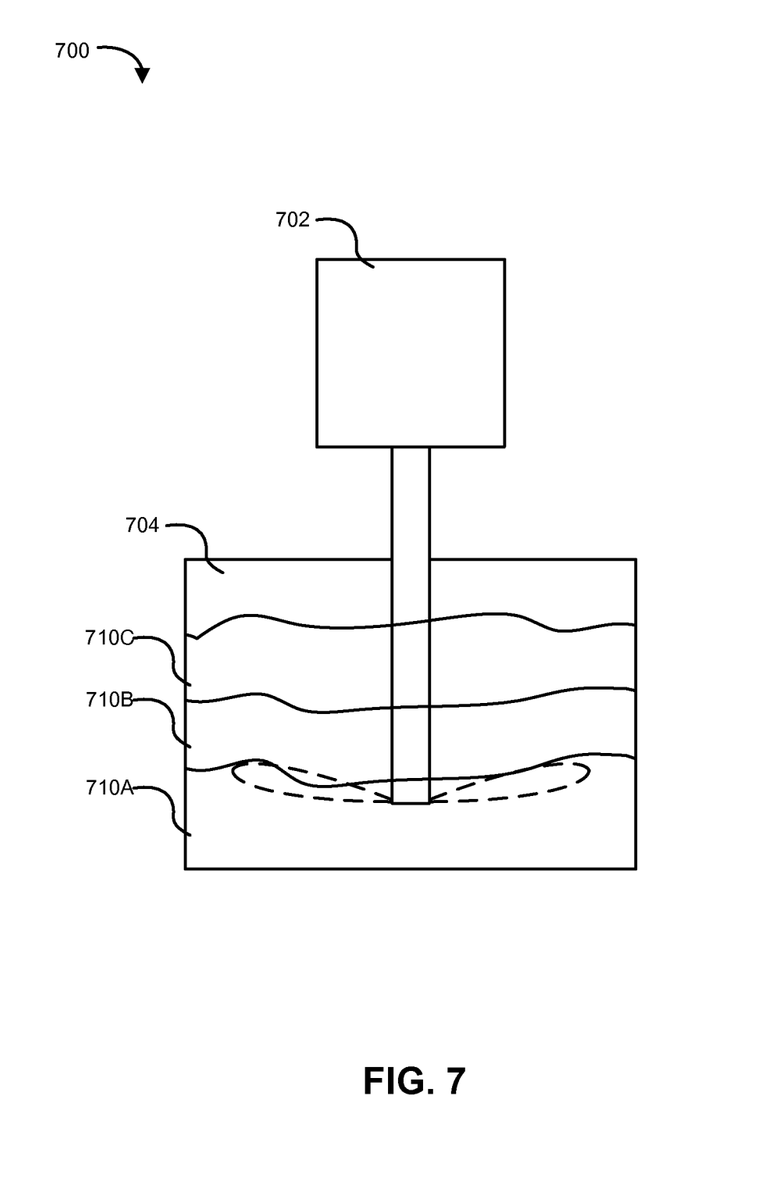
FIG. 7 is a simplified schematic of a mixing system, in accordance with embodiments of the present invention.

FIG. 7 is a simplified schematic of a mixing system 700, in accordance with embodiments of the present invention. The mixing system 700 includes a mixture receptacle 702 and a mixer 704.

Figure 9:
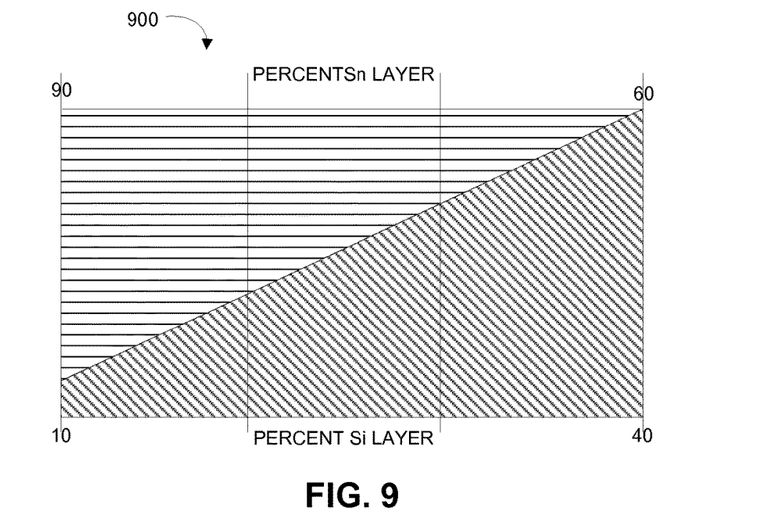
FIG. 9 is a graphical representation of the lithium-ion relationship, in accordance with embodiments of the present invention.

In an operation 605, a quantity of the silicon microparticles 710A and a quantity of the tin microparticles 710B are combined in a selected ratio with a quantity of one or more binder materials 710C in the mixture receptacle 702 to form a microparticle mixture. The microparticles for the hybrid anode materials include the polymer binder of about 5-10 percent by weight of the anode materials. The ratio ranges of the silicon microparticles and tin microparticles are shown in FIG. 9. By way of example the microparticle mixture can include between about 10 percent and about 40 percent, by weight, of silicon microparticles and between about 90 percent and about 60 percent, by weight, of metal microparticles.

Suitable binders can include poly vinylidene fluoride (PVDF), carbon material (carbon black, graphite powder, and carbon fiber, etc.), styrene butadiene rubber (SBR), including gel electrolyte such as polyethylene oxide (PEO), polyacrylonitrile (PAN), poly vinylidene fluoride (PVDF) and poly methyl methacrylate (PMMA).

In an operation 610, combination of the quantity of the silicon microparticles, the quantity of the tin microparticles and the quantity of one or more binder materials are mixed by the mixer 704 to form a mixture 710. The mixer 700 can be a ball type grinding mill and mixer for mixing and milling the mixture in a single operation. A ball type grinding mill and mixer can form microparticles as small as about 5 micrometer.

Figure 8:
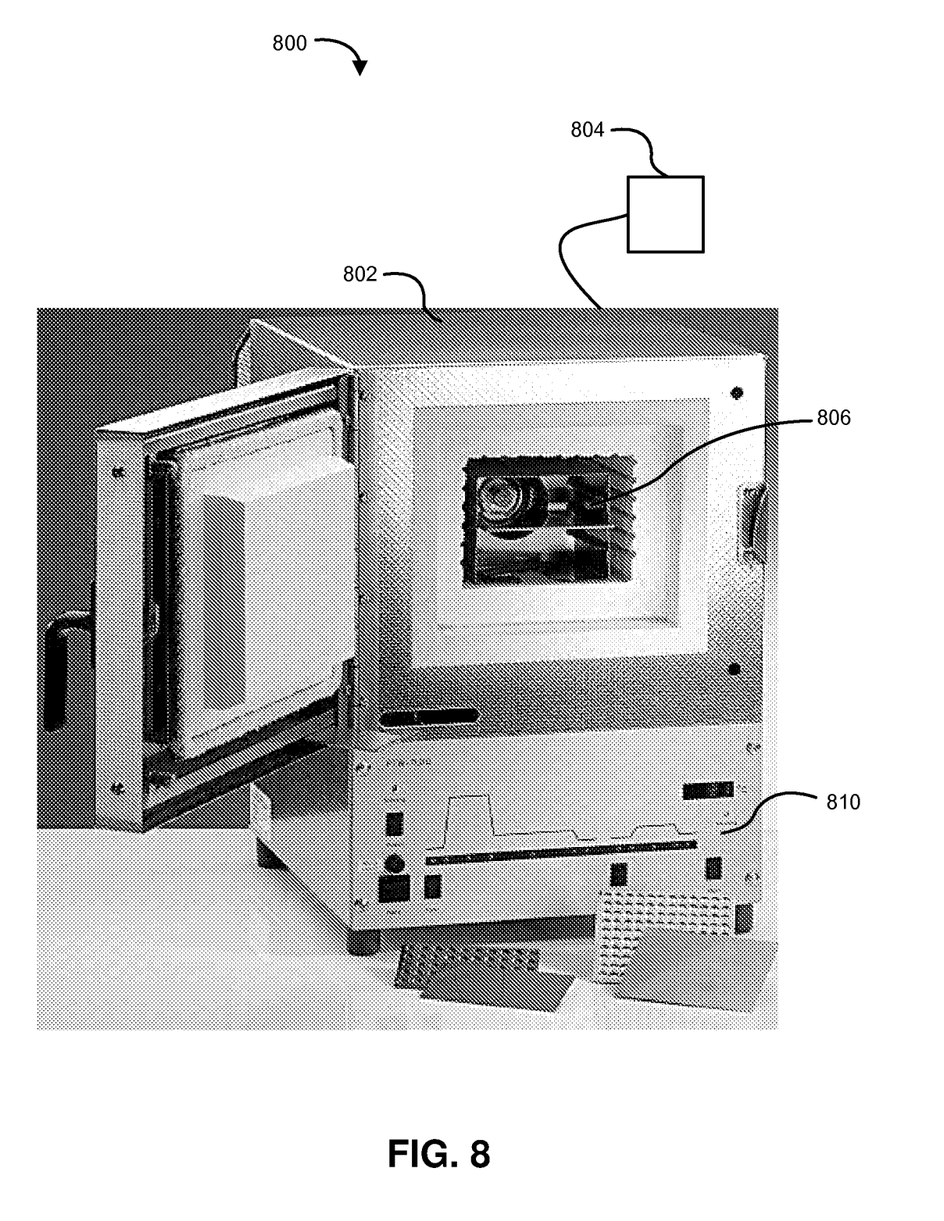
FIG. 8 is a simplified schematic of an annealing chamber system, in accordance with embodiments of the present invention.

FIG. 8 is a simplified schematic of an annealing chamber system 800, in accordance with embodiments of the present invention. The annealing chamber system 800 includes an annealing chamber 802 and at least one gas source 804. The annealing chamber 802 includes a heat source 806 for heating the contents of the annealing chamber. The annealing chamber 802 also includes a controller 810 for controlling the annealing chamber system 800.

In an operation 615, the mixture 710 is moved to the annealing chamber 802. The annealing chamber has an inert gas environment (e.g., argon or nitrogen). The inert gas flow rate into the annealing chamber is between about 50 and about 300 standard cubic centimeters per minute (SCCM).

In an operation 620, the mixed silicon microparticles, tin microparticles and binder materials are heated at a temperature gradient of between 200 and 650 degrees C. over a period of time of between about 5 hours and about 24 hours. Heating the mixed silicon microparticles, tin microparticles and binder materials binds the silicon microparticles and tin microparticles together and the binder materials are substantially evaporated away.

In an operation 625, the bound silicon microparticles and tin microparticles are gradually cooled to a cooled temperature of between about 45 and about 60 degrees C. over a period of time between about 1 hour and about 10 hours to produce an annealed quantity of silicon microparticles and tin microparticles.

In an operation 630, the annealed silicon microparticles, tin microparticles are pressed into a layer having a thickness of between about 2 and about 15 μm. Pressing the annealed silicon microparticles, tin microparticles can be achieved using a conventional press having between about 3.0 kg/cm2 and about 15.0 kg/cm2 to produce a layer of hybrid silicon-based anode material.

In an operation 635, one or more layers of hybrid silicon-based anode material are combined with electrolyte and cathode layers to form the lithium-ion battery of the desired form factor.

FIG. 9 is a graphical representation 900 of the lithium-ion relationship, in accordance with embodiments of the present invention. For a specific lithium-ion capacity, the anode materials are designed and fabricated using appropriate ratio between silicon and soft metal (e.g., tin). The ratio of silicon and soft metal is an important factor for the electrochemical performance. By way of example, for the Si—Sn anode materials in the lithium-ion battery system. The composition ratio in the each hybrid system is optimized for the best electrochemical performance during the battery charge/litiation and discharge/delithiation cycles. In the binary hybrid microparticle structure, the atomic ratio of Si:Sn can be varied from about 1:9 to about 4:6

For the ternary hybrid silicon-based microparticle anode materials, silicon, tin and carbon are main ingredients of the Si-based anode materials. Carbon as a third material for the ternary hybrid structure, the ratio of ternary particles (Si: Sn:C) is 30% of Si, 30% of Sn and 40% of carbon, respectively.

Compared to conventional lithium-ion batteries using graphite anodes or silicone-graphene anodes, the hybrid silicon-based microparticle anode materials described herein can minimize silicon volume changes due to lithium insertion and extraction. The microparticles size of 0.5-5 um result in minimal diffusion path length through the Si-based anodes. This approach improves packing density to maximize lithium-ions during the lithiation and offers improved stability and enhanced capacity with inexpensive methods such as may be useful in an electric vehicle.

The voltage, energy capacity, power, life, and safety of the lithium-ion battery using hybrid silicon-based microparticle anode for an electric vehicle can be changed due to the respective chemical and physical properties by materials selection because the composition in the anodes is tunable and can be controlled during the fabrication.

Figure 10:
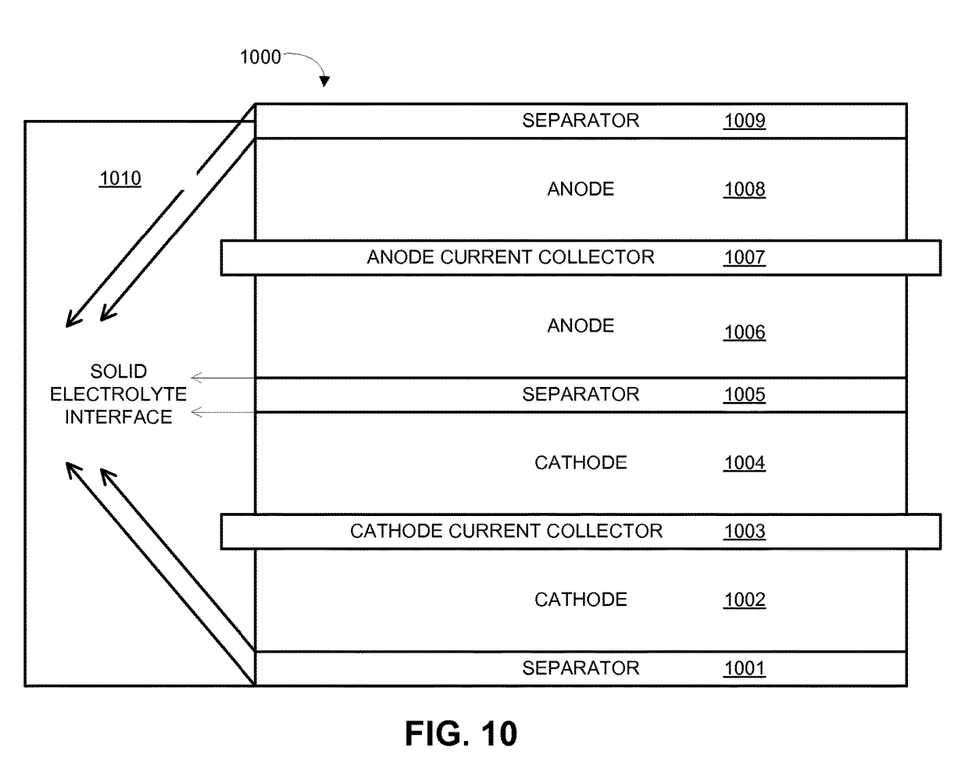
FIG. 10 is a cross-sectional view of a rolled layer lithium ion battery, in accordance with embodiments of the present invention.

FIG. 10 is a cross-sectional view of a rolled layer lithium ion battery 1000, in accordance with embodiments of the present invention. The lithium ion battery 1000 is substantially cylindrical in form. The lithium ion battery 1000 includes one or more cathode layers 1002, 1004 with a cathode current collector 1003 between each pair of cathode layers. The lithium ion battery 1000 also includes one or more anode layers 1006, 1008 with an anode current collector 1007 between each pair of anode layers. A separator layer is disposed between the cathode layer 1004 and the anode layer 1006 so as to separate the anode from the cathode. A quantity of electrolyte 1010 is in contact with at least one end of the rolled layers 1001-1009. The outer layers 1001, 1009 can be separator material or other suitable non-conductive materials.

Alternatively, the layer lithium ion battery can be formed in a stack of hybrid silicon-based microparticle anode layers and cathode layers. In a stacked configuration, the three layers are enclosed in separator layers and the respective edges can be sealed. A gel electrolyte can be used to prevent electrolyte from leaking.

As described above the lithium-ion battery includes a hybrid silicon and soft metal binary or ternerary microparticle anodes for a safe electric vehicle battery. The lithium-ion battery includes shutdown function separators to be protected by potential electrochemical and thermal reaction such as overcharge or short-circuiting.

Figure 11:
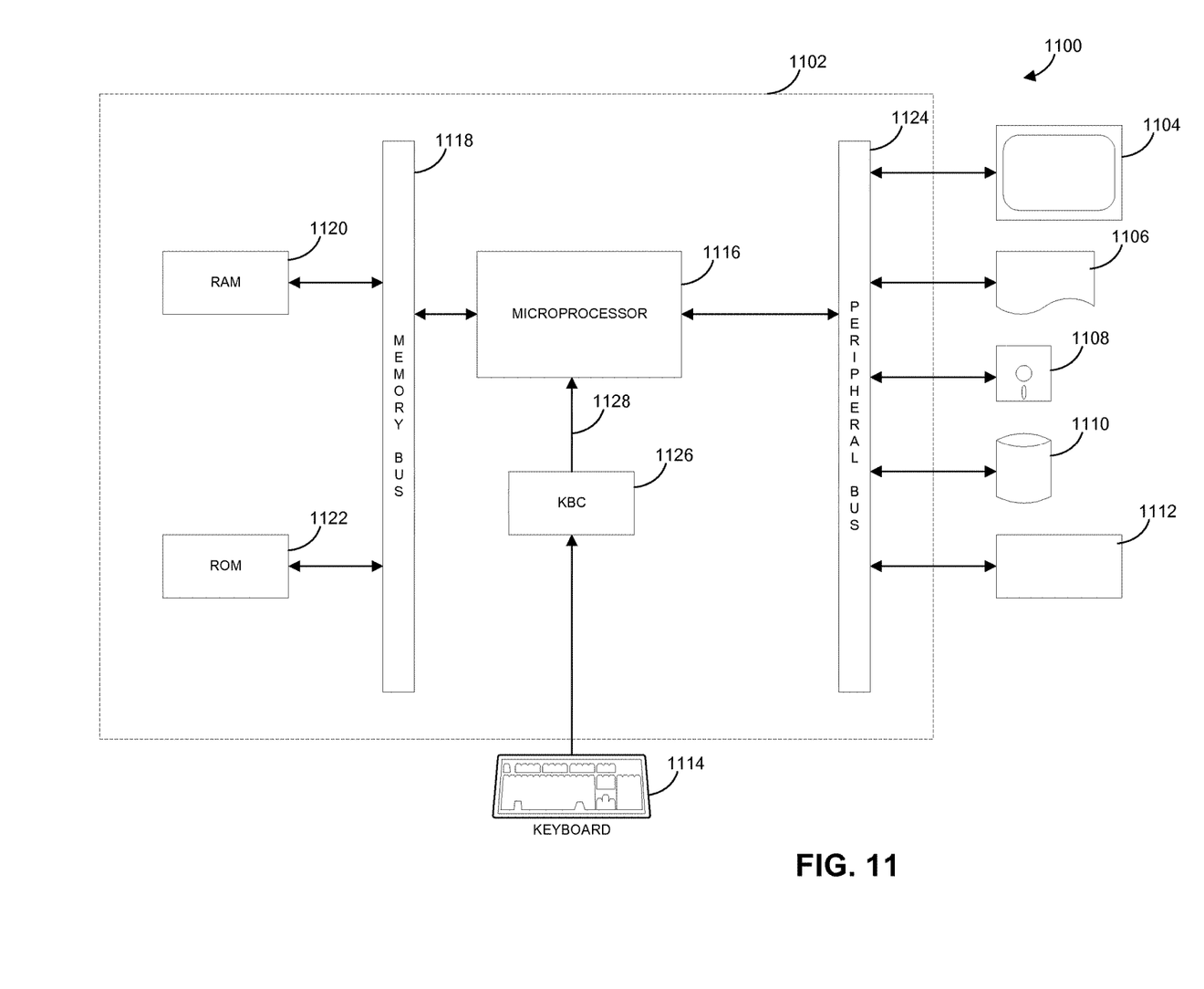
FIG. 11 is a block diagram of an exemplary computer system for carrying out the processing according to the invention.

FIG. 11 is a block diagram of an exemplary computer system 1100 for carrying out the processing according to the invention. The computer system 1100 can be coupled to one or more of the microwave decomposition reactor systems 200, mixing system 700 and annealing system 800 to control the operations of thereof (e.g., controller 230, 810, etc.). The computer system 1100 includes a digital computer 1102, a display screen (or monitor) 1104, a printer 1106, a floppy disk or other computer readable media that is removable 1108, a hard disk drive or similar persistent storage device 1110, a network interface 1112, and a keyboard 1114. The digital computer 1102 includes a microprocessor 1116, a memory bus 1118, random access memory (RAM) 1120, read only memory (ROM) 1122, a peripheral bus 1124, and a keyboard controller (KBC) 1126. The digital computer 1102 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1116 is a general purpose digital processor, which controls the operation of the computer system 1100. The microprocessor 1116 can be a single-chip processor or can be implemented with multiple components. Using instructions retrieved from memory, the microprocessor 1116 controls the reception and manipulation of input data and the output and display of data on output devices.

The memory bus 1118 is used by the microprocessor 1116 to access the RAM 1120 and the ROM 1122. The RAM 1120 is used by the microprocessor 1116 as a general storage area and as scratch-pad memory, and can also be used to store input data and processed data. The ROM 1122 can be used to store instructions or program code followed by the microprocessor 1116 as well as other data.

The peripheral bus 1124 is used to access the input, output, and storage devices used by the digital computer 1102. In the described embodiment, these devices include the display screen 1104, the printer device 1106, the floppy disk drive 1108, the hard disk drive 1110, and the network interface 1112. The keyboard controller 1126 is used to receive input from keyboard 1114 and send decoded symbols for each pressed key to microprocessor 1116 over bus 1128.

The display screen 1104 is an output device that displays images of data provided by the microprocessor 1116 via the peripheral bus 1124 or provided by other components in the computer system 1100. The printer device 1106, when operating as a printer, provides an image on a sheet of paper or a similar surface. Other output devices such as a plotter, typesetter, etc. can be used in place of, or in addition to, the printer device 1106.

The floppy disk or other removable computer readable media 1108 and the hard disk drive or other persistent storage media 1110 can be used to store various types of data. The floppy disk drive 1108 facilitates transporting such data to other computer systems, and hard disk drive 1110 permits fast access to large amounts of stored data.

The microprocessor 1116 together with an operating system operate to execute computer code and produce and use data. The computer code and data may reside on the RAM 1120, the ROM 1122, or the hard disk drive 1110. The computer code and data could also reside on a removable program medium and loaded or installed onto the computer system 1100 when needed. Removable program media include, for example, CD-ROM, PC-CARD, floppy disk, flash memory, optical media and magnetic tape.

The network interface 1112 is used to send and receive data over a network connected to other computer systems. An interface card or similar device and appropriate software implemented by the microprocessor 1116 can be used to connect the computer system 1100 to an existing network and transfer data according to standard protocols.

The keyboard 1114 is used by a user to input commands and other instructions to the computer system 1100. Other types of user input devices can also be used in conjunction with the present invention. For example, pointing devices such as a computer mouse, a track ball, a stylus, or a tablet can be used to manipulate a pointer on a screen of a general-purpose computer.

Figure 12:
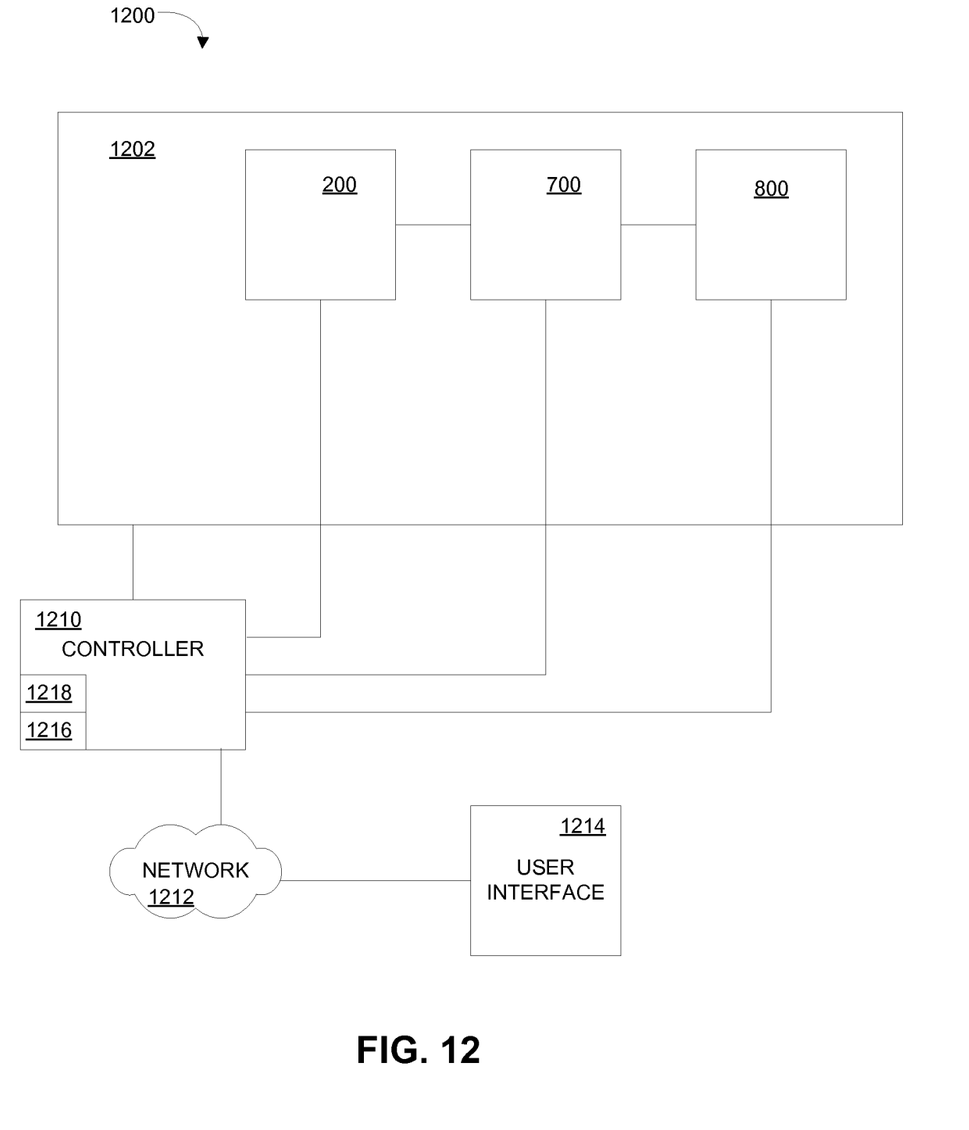
FIG. 12 is a block diagram of an integrated system including one or more of the microwave decomposition reactor systems, mixing system and annealing system, in accordance with an embodiment of the present invention.

FIG. 12 is a block diagram of an integrated system 1200 including one or more of the microwave decomposition reactor systems 200, mixing system 700 and annealing system 800, in accordance with an embodiment of the present invention. The integrated system 1200 includes the one or more of the microwave decomposition reactor systems 200, mixing system 700 and annealing system 800 and an integrated system controller 1210 coupled to the systems 200, 700, 800. Additional systems, not shown, can also be included and coupled to and controlled by the integrated system controller 1210. The integrated system controller 1210 includes or is coupled to (e.g., via a wired or wireless network 1212) a user interface 1214. The user interface 1214 provides user readable outputs and indications and can receive user inputs and provides user access to the integrated system controller 1210.

The integrated system controller 1210 can include a special purpose computer or a general purpose computer. The integrated system controller 1210 can execute computer programs and/or logic 1216 to monitor, control and collect and store data 1218 (e.g., performance history, analysis of performance or defects, operator logs, and history, etc.) for the deposition systems 300, 400 and production system 350. By way of example, the integrated system controller 1210 can adjust the operations of the deposition systems 300, 400 and production system 350 and/or the components therein (e.g., the temperatures, flow rates, pressures, locations, movement, loading and unloading of the substrate 102, etc.) if data collected dictates an adjustment to the operation thereof.

It should be understood that while the soft metal of tin was selected for the above embodiments, any suitable soft metal can be used in similar processes to form the hybrid silicon-based anode materials.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
    forming a quantity of silicon microparticles;
    forming a quantity of metal microparticles such that a size of the metal microparticles is substantially equal to that of the silicon microparticles;
    obtaining a quantity of at least one polymer binder material;
    mixing the quantity of silicon microparticles, the quantity of metal microparticles, and the quantity of at least one polymer binder material in a selected ratio to form a microparticle mixture, wherein the quantity of at least one polymer binder material is between about 5 percent and about 10 percent by weight of the microparticle mixture;
    heating the microparticle mixture until the quantity of at least one polymer binder material is substantially evaporated away; and
    forming the microparticle mixture into a silicon-hybrid anode material layer having a thickness of between about 2 micrometers and about 15 micrometers.

2. The method of claim 1, wherein heating the microparticle mixture includes annealing the microparticle mixture.

3. The method of claim 1, wherein the silicon microparticles have a size range of between about 1 micrometer and about 20 micrometers.

4. The method of claim 1, wherein the metal microparticles have a size range of between about 1 micrometer and about 30 micrometers.

5. The method of claim 1, wherein the selected ratio of the microparticle mixture includes between about 10 percent and about 40 percent, by weight, of silicon microparticles and between about 90 percent and about 60 percent, by weight, of metal microparticles.

6. The method of claim 1, further comprising including the silicon-hybrid anode material layer in a battery.

7. The method of claim 1, further comprising including the silicon-hybrid anode material layer in a lithium-ion battery, the lithium-ion battery further including:
    a lithium containing electrolyte that includes a quantity of separator material;
    an anode disposed on a first side of the lithium containing electrolyte and that includes the silicon-hybrid anode layer; and
    a cathode disposed on a second side of the lithium containing electrolyte opposite from the first side of the lithium containing electrolyte.

8. The method of claim 1, wherein forming the quantity of silicon microparticles includes applying an electromagnetic wave to a silicon source material, hydrogen, and argon.

9. The method of claim 1, wherein the quantity of at least one polymer binder material includes one or more polymer binder materials selected from the group of polymer binder materials including: poly vinylidene fluoride, styrene butadiene rubber, polyethylene oxide, polyacrylonitrile, and poly methyl methacrylate.

* * * * *